Jan. 18, 1955   F. L. HAMEL   2,699,839
APPARATUS FOR PACKING ANTIFRICTION BEARINGS
Filed March 9, 1953   2 Sheets-Sheet 1

INVENTOR.
Frederic L. Hamel,
BY George D. Richards
Attorney

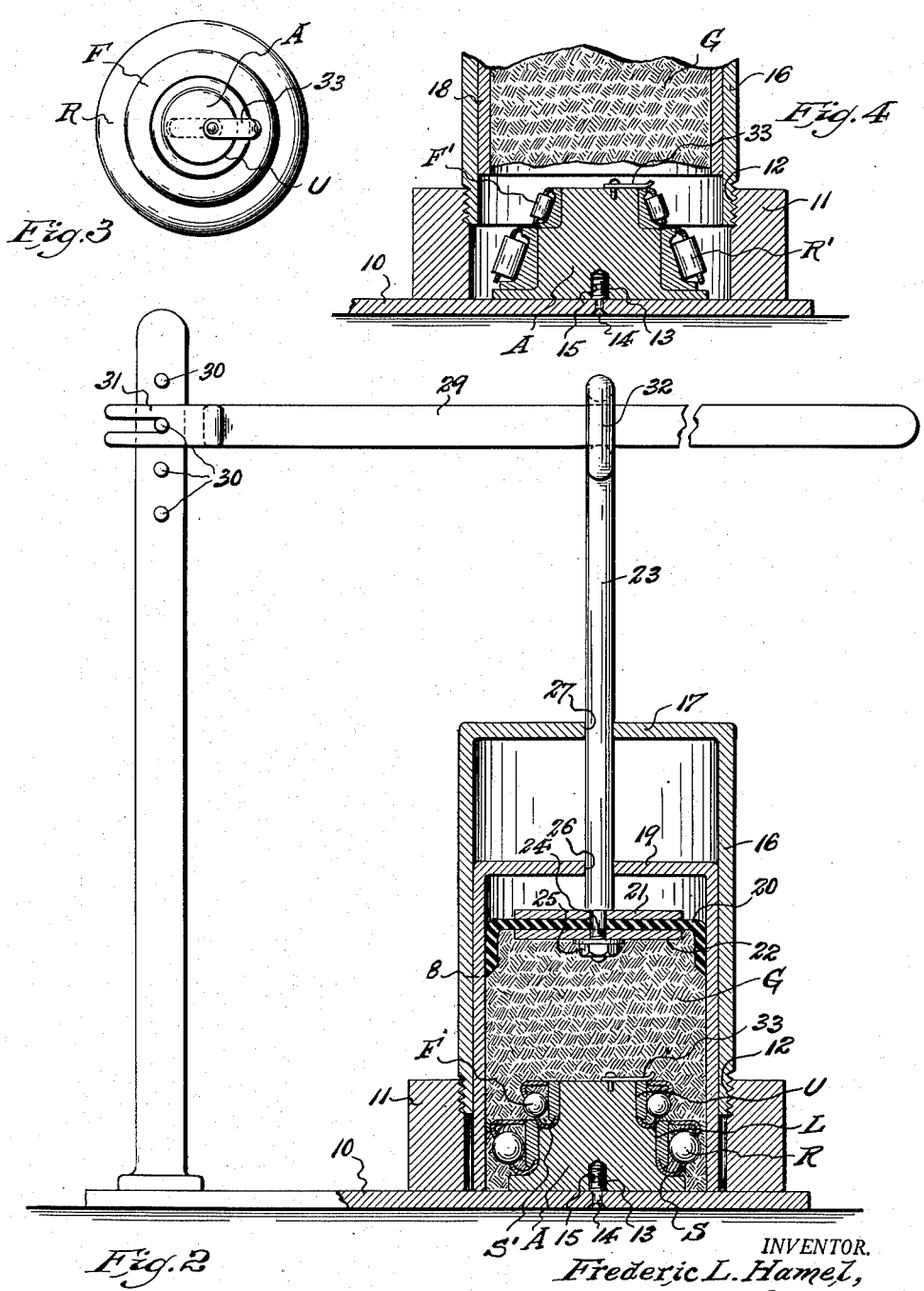

United States Patent Office 2,699,839
Patented Jan. 18, 1955

2,699,839

APPARATUS FOR PACKING ANTIFRICTION BEARINGS

Frederic L. Hamel, Montclair, N. J.

Application March 9, 1953, Serial No. 341,035

8 Claims. (Cl. 184—1)

This invention relates to improved apparatus for packing antifriction bearings with a semi-solid lubricant.

In the use of antifriction bearings of both the ball and roller types, it is customary to fill or pack the interstices intermediate the rotative elements thereof and intermediate these elements and the bodies and cages by which they are supported with a lubricating grease. It is necessary, from time to time, to remove old lubricating grease from such bearings, and repack the latter with fresh clean grease. Ordinarily, the operations of packing and repacking such bearings is a messy, time consuming, and laborious task, and often involves no inconsiderable waste of the lubricating grease. Attempts have been made to provide apparatus designed to lessen the labor, time and waste involved in such packing and repacking operations, but such attempts have not heretofore been wholly successful.

Having the above in view, it is an object of this invention to provide improved apparatus which functions with such novel mode of operation that thorough charging of the bearings operated upon is easily accomplished, and can be rapidly performed in cleanly manner, without risk of substantial loss or waste of the lubricating grease.

The improved apparatus of this invention, although adapted to pack single antifriction bearings used in various kinds of mechanisms, is especially well adapted to pack antifriction bearings, of either the ball or roller type, which are used in automobile wheels. Such automobile wheel bearings usually comprise a relatively large rear bearing and a smaller front bearing. It is a further object of this invention to provide an embodiment thereof so devised that both said rear and front bearings of an automobile wheel can be simultaneously packed with lubricating grease in one operation.

The above and other objects will be understood from a reading of the following detailed description of this invention in connection with the accompanying drawings, in which:

Fig. 2 is a similar view of the same as manipulated to pack lubricating grease into the bearings.

Fig. 3 is a detail top plan view of the means by which the bearings to be treated are supported, and releasably latched to said supporting means.

Fig. 4 is a fragmentary view, similar to that of Fig. 1, the bearings to be treated being shown as of the roller-bearing type.

Similar characters of reference are employed in the hereinabove described views, to indicate corresponding parts.

Figure 1:
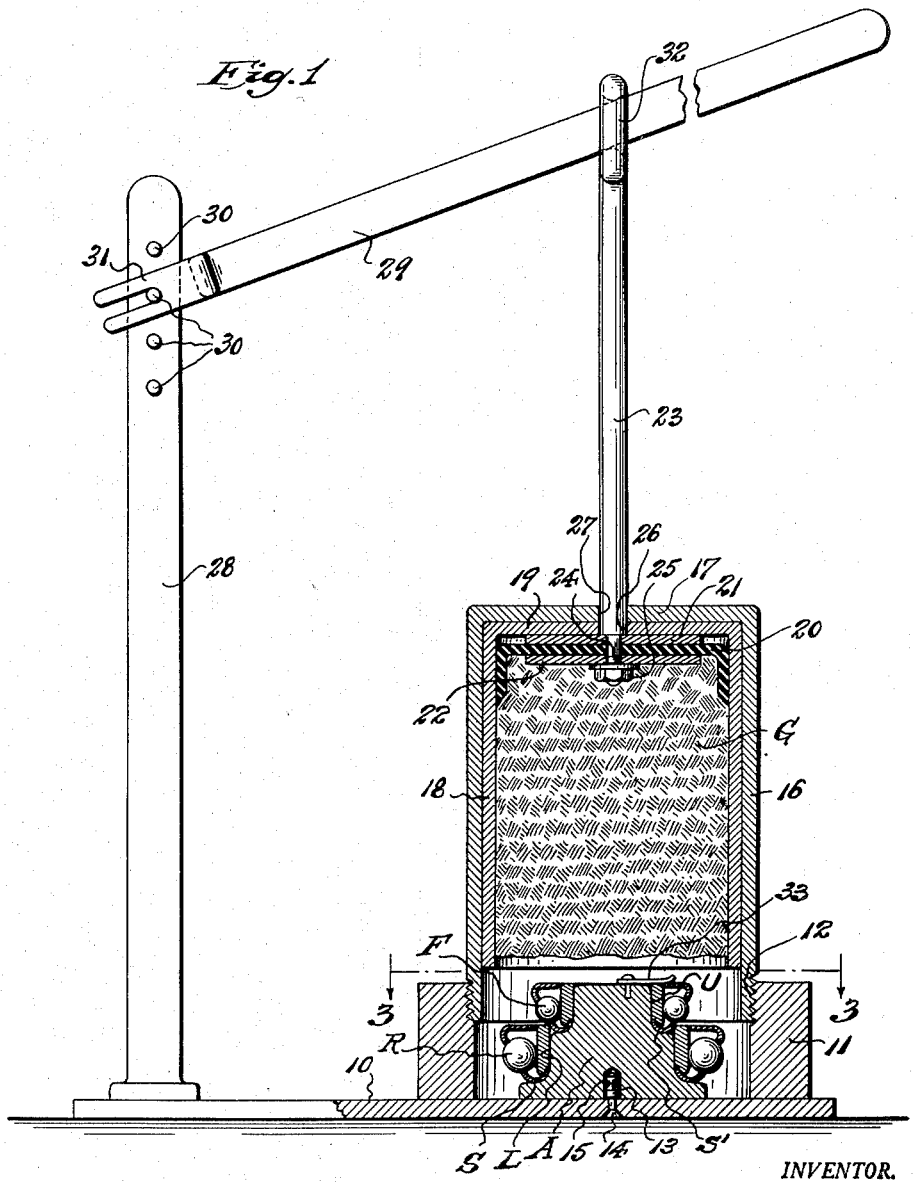
Fig. 1 is a longitudinal sectional view of an illustration embodiment of the invention as initially conditioned preparatory to operation thereof, the bearings to be treated being shown as of the ball-bearing type.

Referring to the drawings, the reference character 10 indicates a base plate upon which is suitably affixed an upwardly open bottom member 11, the mouth of which is provided with internal screw threads 12. Removably mounted on the base plate 10, so as to be centrally disposed within said bottom member 11, is a fixture or adapter A. This fixture or adapter A is suitably shaped to receive and support one or more anti-friction bearings which are desired to be packed with lubricating grease. One means for removably attaching said fixture or adapter A to the base plate 10 within the bottom member 11 comprises an up-standing screw-threaded coupling stud 13, which is affixed to the base plate, as by an axial shank 14 riveted thereto. The fixture or adapter A is provided in its underside with an axially disposed, internally screw-threaded socket 15 to receive said coupling stud 13, when said fixture or adapter A is screwed onto the latter, whereby to detachably affix the fixture or adapter to the base plate 10 in operative seated and axially disposed position within the bottom member 11.

The reference character 16 indicates a downwardly open cylinder member, which is closed at its upper end by a top wall 17. Slidably fitted within said cylinder member 16 is a downwardly open, axially movable encasing sleeve 18. This encasing sleeve 18 is, preferably, also closed at its upper end by a top wall 19. Fitting the interior of said encasing sleeve 18, in sliding engagement with the side walls thereof, is a plunger, which is formed, for example, by an inverted cup-leather 20 supported between upper and lower rigid face plates 21 and 22. This plunger is affixed to the lower end of a plunger rod 23, as by a screw-threaded coupler shank 24 of reduced diameter, which extends through the face plates and cup-leather, whereby these parts are secured to the plunger rod by a nut and washer 25. Such arrangement is but illustrative, since it will be obvious that the plunger rod and plunger may be connected in assembled relation in any other suitable manner by other suitable means. The cup-leather 20 may be made of any suitable flexible material, such as rubber, leather or the like. The upwardly extending plunger rod 23 slidably extends through openings 26 and 27 with which the top wall 19 of sleeve 18 and top wall 17 of cylinder member 16 are respectively provided, so that said plunger rod 23 projects exteriorly upward from the top end of said cylinder member 16.

The lower end of the cylinder member 16 is externally screw-threaded whereby the same may be detachably connected with the bottom member 11, in upstanding and communicating relation to the latter, by engaging the same with the internal screw-threads 12 thereof.

Affixed to the base plate 10, in laterally offset relation to the bottom member 11, is an upstanding fulcrum post 28. Means is provided for pivotally, and preferably detachably and adjustably, connecting with the fulcrum post 28 a lever member 29 by which the plunger of the apparatus can be reciprocated. An illustrative arrangement to this end comprises the provision of a plurality of transversely projecting fulcrum pins 30, vertically spaced in connection with said fulcrum post, so as to be selectively engageable by a forked, bifurcated inner end portion 31 of said lever member 29, whereby to fulcrum the latter in connection with the fulcrum post 28. The plunger rod 23 is provided with means engageable by said lever member 29, whereby reciprocating movement may be imparted to the former by the latter. An illustrative means for so relating the lever member 29 to the plunger rod 23, as shown, comprises the provision, at the upper end of the latter, of a coupler loop 32 through which the lever member can be extended from the fulcrum post 28. Any other suitable means may be provided for operatively connecting said lever member with the plunger rod.

To prepare the apparatus for use, after the plunger and encasing sleeve 18 is raised to uppermost position within the cylinder member 16, the lever member 29 is disconnected from the plunger rod 23, whereupon the cylinder member 16 is detached from the bottom member 11. While the cylinder member is thus removed from the bottom member, the interior of the encasing sleeve 18 is filled with lubricating grease G.

Assuming it is desired to pack with lubricating grease front and rear automobile wheel antifriction bearings of the ball-bearing type, a fixture or adapter A, shaped to support such bearings, is mounted within the bottom member 11. This fixture or adapter comprises a lower upstanding portion L which is diametrically sized conformably to the interior of the larger rear ball-bearing R. This portion L rises from an annular seat S by which said rear ball-bearing is supported when mounted on the fixture or adapter. Rising from said lower portion L of the fixture or adapter A is an upper portion U which is diametrically sized conformably to the interior of the smaller front ball-bearing F, and rises from an annular seat S' by which said front ball-bearing is supported in position above the rear ball-bearing R.

The rear and front ball-bearings R and F having been applied to the adapter A, so as to be supported thereby, the cylinder member 16, with the charge of lubricating grease G contained in the encasing sleeve 18, is coupled to and in communication with the bottom member 11, whereupon the lever member 29 is operatively connected to and between the fulcrum post 28 and plunger rod 23, thus conditioning the apparatus for operation.

To operate the thus conditioned apparatus, the operator merely swings down the lever member 29, whereby to cause downward movement of the plunger. The frictional engagement of the cup-leather 20 of the plunger with the side walls of the encasing sleeve 18, transmits the downward movement of the plunger to said encasing sleeve, thereby causing the latter to slide downwardly through the cylinder member 16 and into the interior of the bottom member 11 until it is stopped by abutment of its lower open end against the base plate 10. The encasing sleeve is thus positioned in surrounding and enclosing relation to the supported bearings R and F. Continued downward movement of the plunger thereupon forces the lubricating grease G into the interior of the supported bearings, thereby packing the bearings with a full charge of said grease (see Fig. 2).

The bearings having been packed with the lubricating grease, the plunger is upwardly retracted to return the same and the encasing sleeve 18 to initial raised positions within the cylinder member 16. In order to prevent upward displacement of the packed bearings from the fixture or adapter A, during retractive movement of the plunger and encasing sleeve, said fixture or adapter is provided, in connection with its upper free end, with a pivoted keeper member 33. This keeper member can be swung outwardly into overlapping extension over the top of the upper front bearing F. When not in use, said keeper member 33 can be swung inwardly to be within the boundaries of the top end of said fixture or adapter A (see dotted representation thereof shown in Fig. 3), in which position it offers no obstruction to the bearings, when the latter are applied to or removed from the fixture or adapter. After the plunger and encasing sleeve are returned to normal initial raised positions, the lever member 29 is disconnected from the fulcrum post 28 and plunger rod 23, whereafter the cylinder member 16 is detached from the bottom member 11, thereby exposing the packed bearings subject to removal from the fixture or adapter A ready for reassembly in an automobile wheel to be served thereby.

The fixture or adapter A may be suitably modified in shape to accommodate the same for reception and support of other types of antifriction bearings, such as those of the roller-bearing type shown in Fig. 4, and comprising a rear roller-bearing R' and a front roller-bearing F'.

Although the fixtures or adapters have been shown in forms adapted to accommodate two bearings, it will be obvious that the same may be provided in form to accommodate a single bearing, or in form to accommodate more than two bearings. It is also pointed out that the bottom member and cylinder member with its plunger and encasing sleeve may be of such cross-sectional shape and of such size as to accommodate more than one fixture or adapter, so that several bearings or bearing sets may be packed with lubricating grease in one operation.

It will be further understood that antifriction bearings for use in mechanisms other than automobile wheels may be accommodated by the apparatus for lubricating grease packing treatment.

Having now described my invention, I claim:

1. Apparatus for packing antifriction bearings with lubricating grease comprising an upwardly open bottom member closed at its lower end by a floor, a fixture supported within the bottom member on the floor thereof for holding the bearing or bearings to be packed, a downwardly open cylinder member having a closed top end, means to detachably couple the cylinder member to the bottom member in axially aligned communicating relation thereto, a downwardly open encasing sleeve slidably movable in the bore of the cylinder member, a plunger slidably engaging the interior of said encasing sleeve, and means to reciprocate said plunger and the encasing sleeve in the cylinder member, upward movement of the plunger being operative to move the encasing sleeve therewith to a raised position within the cylinder member whereby the interior of the encasing sleeve beneath the plunger provide a chamber for reception of lubricating grease, downward movement of the plunger being operative to first lower the encasing sleeve into the bottom member in stopped abutment against the floor of the latter and in enclosing relation to the bearing or bearings therein, whereupon continued downward movement of the plunger in the arrested encasing sleeve forces lubricating grease into said bearing or bearings to pack the latter therewith.

2. Apparatus for packing antifriction bearings with lubricating grease according to claim 1 including means for detachably securing the bearing supporting fixture to the floor of the bottom member.

3. Apparatus for packing antifriction bearings with lubricating grease according to claim 2, wherein the bearing supporting fixture comprises an upstanding lower portion of major diameter to receive a relatively large bearing and having an annular seat to support said bearing, and an upper portion of minor diameter upstanding from said lower portion to receive a relatively small bearing and having an annular seat to support said small bearing above said large bearing.

4. Apparatus for packing antifriction bearings with lubricating grease according to claim 3, including a manipulatable keeper member carried by the upper portion of the fixture, said keeper member being movable into and out of position to retain the supported bearings against accidental displacement from the fixture.

5. Apparatus for packing antifriction bearings with lubricating grease comprising a base plate, an upwardly open bottom member fixed on said base plate, a fixture within the bottom member for supporting the bearing or bearings to be packed, a downwardly open cylinder member, means to detachably couple the cylinder member in axially aligned communicating relation to the bottom member, a downwardly open encasing sleeve slidably supported within the cylinder member, a plunger slidably movable in said encasing sleeve, a plunger rod extending upwardly from said plunger exteriorly of the cylinder member, the interior of the encasing sleeve beneath said plunger providing a chamber to be supplied with lubricating grease, a fulcrum post upstanding from the base plate in laterally offset relation to the cylinder member, and a lever member fulcrumed by said fulcrum post and engageable with the plunger rod for reciprocating the plunger, initial downward movement of the plunger being operative to move the encasing sleeve downwardly into the bottom member to enclose the bearing or bearings supported therein, whereafter continued downward movement of said plunger forces lubricating grease into said bearing or bearings to pack the latter therewith.

6. Apparatus for packing antifriction bearings with lubricating grease according to claim 5 including means for detachably securing the bearing supporting fixture to the floor of the bottom member.

7. Apparatus for packing antifriction bearings with lubricating grease according to claim 6, wherein the bearing supporting fixture comprises an upstanding lower portion of major diameter to receive a relatively large bearing and having an annular seat to support said bearing, and an upper portion of minor diameter upstanding from said lower portion to receive a relatively small bearing and having an annular seat to support said small bearing above said larger bearing.

8. Apparatus for packing antifriction bearings with lubricating grease according to claim 7, including a manipulatable keeper member carried by the upper portion of the fixture, said keeper member being movable into and out of position to retain the supported bearings against accidental displacement from the fixture.

References Cited in the file of this patent

UNITED STATES PATENTS

| | | |
|---|---|---|
| 908,219 | Dressel | Dec. 29, 1908 |
| 1,051,293 | Vesey | Jan. 21, 1913 |
| 1,101,092 | Platner | June 23, 1914 |
| 2,652,843 | Schuchman | Sept. 22, 1953 |